United States Patent Office 3,519,637
Patented July 7, 1970

3,519,637
1-(4-THIAZOLYLMETHYL)NITROIMIDAZOLE DERIVATIVES
Max Hoffer, Nutley, N.J., assignor to Hoffmann-La Roche Inc., Nutley, N.J., a corporation of New Jersey
No Drawing. Filed Dec. 6, 1966, Ser. No. 599,406
Int. Cl. C07d 91/34
U.S. Cl. 260—306.8                    8 Claims

ABSTRACT OF THE DISCLOSURE

Novel 1 - (4 - thiazolylmethyl)nitroimidazoles are disclosed, along with processes for their preparation by reacting a 1-(3-haloacetonyl)nitroimidazole with a thiourea. The compounds are useful in the treatment of infections due to pathogenic protozoa.

---

This invention relates to a new class of nitroimidazole derivatives and to a process for the preparation thereof. More particularly, it relates to novel 1-(4-thiazolylmethyl)nitroimidazoles of the formula

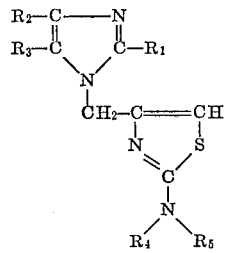

(I)

wherein $R_1$, $R_2$ and $R_3$ are each independently selected from the group consisting of hydrogen, halogen, lower alkyl and nitro, such that at least one of $R_1$, $R_2$ and $R_3$ is nitro; $R_4$ is hydrogen or lower alkyl and $R_5$ is selected from the group consisting of hydrogen, lower alkyl, cyclolower alkyl, lower alkenyl, lower alkynyl, phenyl, substituted phenyl, phenyl-lower alkyl, substituted phenyl-lower akyl, lower alkanoyl, carboxy lower alkanoyl, benzoyl, substituted benzoyl, carbalkoxy, carbamyl, amidino, or taken together, $R_4$ and $R_5$ can represent an alkylene, aza-alkylene, oxa-alkylene or thia-alkylene group in which the alkyl portion of said alkylene, aza-alkylene, oxa-alkylene or thia-alkylene group contains from 3 to 5 carbon atoms so as to form with the nitrogen atom to which it is joined a nitrogen-containing heterocycle of 5 to 6 members.

As used throughout this disclosure, the term "lower alkyl" denotes both straight and branched chain saturated hydrocarbon groups containing 1 to 7 carbon atoms, e.g., methyl, ethyl, propyl, isopropyl, butyl, etc. The term "lower alkenyl" denotes olefinically unsaturated hydrocarbons containing 1 to 7 carbon atoms, e.g., vinyl, 1-propenyl, allyl, isopropenyl, crotyl, 3-butenyl, t-butenyl, etc. The term "lower alkynyl" denotes an unsaturated straight or branched chain hydrocarbon of the acetylene series containing 1 to 7 carbon atoms, e.g., ethyne, propyne, butyne, etc. The term "halogen" denotes all four halogens, i.e., chlorine, bromine, iodine and fluorine. The middle halogens, i.e., bromine and chlorine, constitute a preferred group. The term "substituted phenyl" denotes a phenyl nucleus in which one or more of the hydrogen atoms has been replaced by one of the functional groups: hydroxy, amino, lower alkylamino, di-lower alkylamino, halogen, trihalomethyl, particularly trifluoromethyl, lower alkyl, lower alkoxy and nitro. Phenyl groups containing a hydroxy, halogen, lower alkyl, lower alkoxy, amino or trifluoromethyl substituent in para position are preferred, though phenyl groups containing substituents in other positions as well as phenyl groups containing more than one functional substituent are also within the scope of this invention. The term "substituted benzoyl" denotes a benzoyl group wherein the phenyl moiety is a substituted phenyl as defined above. The term "lower alkanoyl" denotes the acyl residue of a lower alkanoic acid, e.g., formyl, propionyl, butanoyl, etc. The term "carboxy-lower alkanoyl" denotes the group $$COOH-(CH_2)_n-CO-$$

where $n$ is 1 to 7. The term "carbalkoxy" denotes the group $C_nH_{2n+1}$ where $n$ is 1 to 7. The term "alkylene" denotes the group $-(CH_2)_m-$ where $m$ is 4 to 5. The terms "aza-alkylene," "oxa-alkylene" and "thia-alkylene," respectively, denote the groups

$$-(CH_2)_p-N-(CH_2)_q-, \; -(CH_2)_p-O-(CH_2)_q-$$
$$\text{and} \; -(CH_2)_p-S-(CH_2)_q-$$

where $p$ and $q$ each represent integers from 0–4 such that the sum of $p$ plus $q$ equals 3 to 4. Thus, when $R_4$ and $R_5$ represent alkylene, aza-alkylene, oxa-alkylene or thia-alkylene as defined above, they form with the nitrogen to which they are attached a 5 to 6 membered nitrogen-containing heterocyclic group such as imidazolidinyl, pyrrolidinyl, pyrazolidinyl, piperidyl, piperazinyl, oxaxolidinyl, morpholinyl, thiazolidinyl, thiomorpholinyl, etc.

The novel compounds of this invention are prepared by reacting a 1-(3-haloacetonyl)nitroimidazole with a thiourea derivative according to the following reaction sequence:

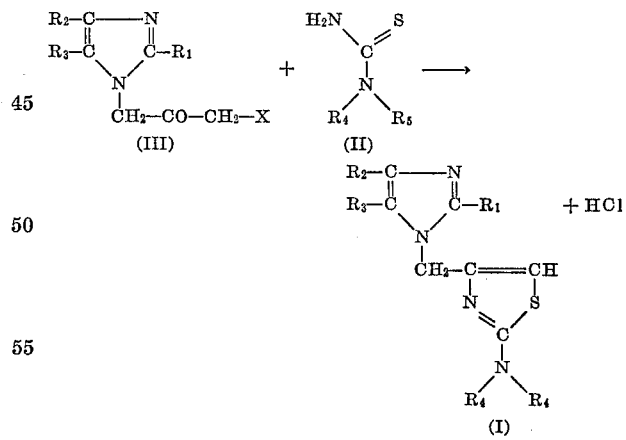

wherein $R_1$, $R_2$, $R_3$, $R_4$ and $R_5$ have the same meaning as above and X is bromo or chloro. The reaction is preferably carried out in an inert organic solvent such as alkanols, e.g., methanol, ethanol, etc.; hydrocarbons such as benzene, xylene, etc.; tetrahydrofuran, dioxane and the like and preferably at an elevated temperature, i.e., a temperature between about room temperature and the reflux temperature of the reaction mixture, though higher or lower temperatures can also be employed.

The 1-(3-haloacetonyl)nitroimidazole intermediates of Formula III are prepared by oxidation of the corresponding 1-(3-halo-2-hydroxypropyl)-nitroimidazoles which are in turn prepared from known nitroimidazole starting material as illustrated schematically by the following reaction sequence:

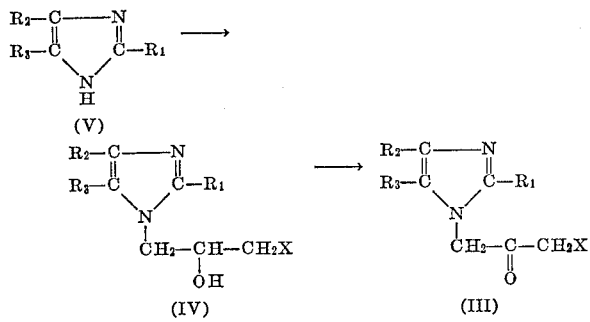

wherein $R_1$, $R_2$, $R_3$ and X all have the same meaning as hereinabove.

Compounds of Formula IV wherein $R_3$ is other than nitro are conveniently prepared by treating the corresponding nitroimidazole starting material of Formula V with an epihalohydrin, preferably epichlorohydrin or epibromohydrin. The reaction with epihalohydrin is suitably carried out at an elevated temperature, preferably a temperature between about 50° C. and 150° C. and preferably in the presence of a catalytic amount of an alkali metal salt. Suitable alkali metal salts are the salts of the weak acids, for example, the carbonates such as sodium carbonate, potassium carbonate, etc., the acetates such as sodium acetate, potassium acetate and the like. If desired an alkali metal salt of the nitroimidazole starting material of Formula V can be employed to catalyze the reaction. The amount of alkali metal salt is not critical. Ordinarily about one percent by weight or less based upon the weight of the nitroimidazole starting material is suffiicent. The reaction can be carried out in any convenient solvent such as water or an organic solvent such as ethanol and the like, or, if desired, the epihalohydrin reactant may also be employed as solvent.

The 5-nitroimidazole intermediates of Formula IV, i.e., compounds of Formula IV wherein $R_3$ is nitro, are prepared from the corresponding 5-nitroimidazole starting material of Formula V via the 1-(2,3-epoxypropyl)-5-nitroimidazole intermediate obtained by treating the 5-nitroimidazole starting material of Formula V with bis(3-halo-2-hydroxypropyl)sulfate followed by treatment with an acid neutralizing agent, e.g., a strong base such as sodium hydroxide, potassium hydroxide and the like and treating with acid to separate the desired 5-nitro intermediate of Formula IV. The reaction with bis(3-halo-2-hydroxypropyl)sulfate is suitably carried out at an elevated temperature, preferably, a temperature between about 120 and 140° C. Acidification to separate the 1-(3-halo-2-hydroxypropyl)-5-nitroimidazole product is readily effected at room temperature or above or below room temperature by addition of any of the usual acids, such as a hydrohalic acid, e.g. hydrochloric acid.

The oxidation of the 1-(3-halo-2-hydroxypropyl)-nitroimidazole compounds of Formula IV is conveniently accomplished by the use of a suitable chemical oxidant, e.g., a chromate oxidizing agent such as chromic acid or a solution prepared from a chromate salt such as potassium dichromate, sodium dichromate and the like in a strong acid such as sulfuric acid. The oxidation reaction is preferably carried out at about room temperature, though higher or lower temperatures, e.g., temperatures in the range of about 0° to about 100° C. can also be used.

The 1-(3-haloacetonyl)-nitroimidazole intermediates of Formula III wherein $R_1$ is other than nitro are novel compounds which also constitute a part of this invention. The nitroimidazole starting materials of Formula V as well as the thiourea derivatives of Formula II are known compounds or analogs of known compounds which are readily accessible to those skilled in the art by procedures analogous to those used in the preparation of the known materials.

The novel compounds of Formula I, can, if desired, be converted into acid addition salts by reacting with a suitable acid. Suitable acids are, for example, the inorganic acids such as hydrohalic acids, phosphoric acid, sulfuric acid and the like, and the organic acids such as acetic, maleic, tartaric, citric, succinic, etc. Pharmaceutically acceptable salts are prepared from pharmaceutically acceptable acids.

The novel end products are useful as chemotherapeutic agents. In particular, they are useful in the treatment of infections due to pathogenic protozoa such as certain species of amoebae, e.g., *E. histolytica*. More specifically, they are useful as trichomoacides against, for example, *Trichomonas vaginalis*, *Trichomonas foetus*, etc. The novel compounds of Formula III, in addition to being useful as novel intermediates in the preparation of the end product of Formula I, are also useful as anti-protozoal agents. More particularly, they are useful as trichomonacides.

The novel compounds of this invention can be administered systemically, for example, orally, locally, e.g., topically or subcutaneously with dosages adjusted to individually requirements. They can be administered in conventional pharmaceutical forms or in admixture with conventional organic or inorganic pharmaceutical carriers suitable for oral administration, such as starches, lactose, sucrose, gelatin, magnesium stearate, talc, vegetable oils, gums and the like. They can also contain other therapeutically valuable substances or they can contain pharmaceutical adjuvants such as preservatives, stabilizing agents, wetting agents, emulsifying agents and the like. The pharmaceutical preparations can be in conventional solid forms such as tablets, capsules, lozenges and the like and in conventional liquid forms, such as suspensions, emulsions, and the like. They can be submitted to conventional pharmactical expedients such as, for example, sterilization, etc.

The invention will be more fully understood from the examples which follow. These examples are to be construed as illustrative of the invention and not limitative thereof. All temperatures are stated in degrees centigrade and all melting points are corrected.

EXAMPLE 1

Preparation of 1-(2-amino-4-thiazolylmethyl)-2-methyl-4-nitroimidazole 300 ml. of epichlorohydrin, 50 g. of 2-methyl-4- (or 5-) nitroimidazole and 0.5-1 g. of 2-methyl-4- (or 5-) nitroimidazole sodium were heated under stirring and reflux to 110-118° for 10 minutes. Upon chilling the product crystallized and was recovered by suction filtration. The mother liquor was vacuum distilled from a hot water bath to recover excess epichlorohydrin and an additional crop of the product was recovered by recrystallization of the residue from alcohol. The melting point of the product is 150-151°.

60 g. of 1-(3-chloro-2-hydroxypropyl)-2-methyl-4-nitroimidazole was dissolved in 7 normal aqueous sulfuric acid, 250 ml. and 60 g. of crystallized sodium dichromate ($Na_2Cr_2O_7 \cdot 2H_2O$) was added at 40-50° under stirring in small portions. The mixture was stirred overnight, the deposited crystals of the product were filtered by suction and recrystallized from acetic acid to give 1-(3-chloroacetonyl)-2-methyl-4-nitroimidazole melting at 196° under decomposition.

1-(3-chloroacetonyl)-2-methyl-4-nitroimidazole, 8.9 g. (0.041 mole), and thiourea, 3.8 g. (0.05 mole) were refluxed with 100 ml. of alcohol for 30 minutes. Upon chilling the hydrochloride of 1-(2-amino-4-thiazolymethyl)-2-methyl-4-nitroimidazole, M.P. 256° with decomposition, crystallized out. The free base of M.P. 186–187° crystallized from alcohol as lemon-colored prisms.

EXAMPLE 2

Preparation of 1-(2-amino-4-thiazolymethyl)-2-methyl-5-nitroimidazole 50 g. of 2-methyl-4- (or 5-) nitroimidazole and 125 g. of bis-(3-chloro-2-hydroxypropyl)sulfate were heated under stirring to 125–135° for 3 hours. The resulting homogeneous syrup was allowed to cool and dissolved in 80 ml. of water below 40°. The solution was chilled to 10–15° and an aqueous sodium hydroxide solution, 150 ml. 3 N, and methylene chloride, 200 ml., were added simultaneously at 10–20°. The layers were separated, the aqueous layer extracted once more with 100 ml. of methylene chloride and the combined methylene chloride layers washed repeatedly with 3 N aqueous sodium hydroxide solution. The methylene chloride was removed by evaporation in vacuo and the residue slurried with ether for crystallization. The product recrystallized from water or ethyl acetate formed practically colorless prisms of 1-(2,3-epoxypropyl)-2-methyl-5-nitroimidazole melting at 110–111°.

5 g. of 1-(2,3-epoxypropyl)-2-methyl-5-nitroimidazole was added to 30 ml. of concentrated aqueous hydrochloric acid. The solution was heated to the boiling point for 20 minutes, chilled, diluted with 30 ml. of water and carefully neutralized with ammonia to a pH of 7–8. It was then saturated with ammonium sulfate. The precipitated oil crystallized after several days. Recrystallized from toluene, there was obtained the 1-(3-chloro-2-hydroxypropyl)-2-methyl-5-nitroimidazole product melting at 77–78°.

1 - (3-chloro-2-hydroxypropyl)-2-methyl-5-nitroimidazole, 22 g. (0.1 mole), were dissolved in 100 ml. of 7 normal aqueous sulfuric acid at 40–50°: 20 g. of sodium bichromate ($Na_2Cr_2O_2 \cdot 2H_2O$) was added in small portions under stirring at such a rate that the temperature of the reaction mixture did not exceed 60°. The temperature was then kept at 60–80° for 1 hour under stirring. The green reaction mixture was chilled and partly neutralized by the dropwise addition of 100 ml. of concentrated ammonia at temperatures below 20°. The reaction mixture was extracted twice, using 150 ml. of ethyl acetate each time. Evaporation of the ethyl acetate extract gave the product 1 - (3-chloroacetonyl) - 2-methyl-5-nitroimidazole as a crystalline residue which, when recrystallized from alcohol, melted at 110°.

11 g. (0.05 mole) of 1-(3-chloroacetonyl)-2-methyl-5-nitroimidazole, 4 g. (0.0525 mole) of thiourea and 20 ml. of alcohol were refluxed for 30 minutes. Upon chilling the crystallized product 1-(2-amino-4-thiazolylmethyl)-2-methyl - 5 - nitroimidazole hydrochloride was recovered having melting point 197–198° dec. The free base formed yellow prisms of M.P. 171°.

EXAMPLE 3

Preparation of 1-(2-acetamino-4-thiazolymethyl)-2-methyl-5-nitroimidazole 8.5 g. (0.031 mole) of 1-(2-amino-4-thiazolymethyl)-2 - methyl-5-nitroimidazole hydrochloride, 4.1 g. (0.05 mole) of sodium acetate and 20 ml. of acetanhydride were refluxed for 10 minutes. After chilling the product was precipitated by the addition of 50 ml. of water. The product melted at 257–258°.

EXAMPLE 4

Preparation of 1-(2-anilino-4-thiazolylmethyl)-2-methyl-5-nitroimidazole 3.3 g. (0.015 mole) of 1-(3-chloroacetonyl)-2-methyl-5-nitroimidazole, prepared as in Example 2, 2.0 g. (0.015 mole) of phenyl thiourea and 20 ml. of alcohol were refluxed for 30 minutes. The solution was diluted with 40 ml. of water and neutralized with ammonia. The product precipitated in yellow prisms which were recrystallized from alcohol, melting point 188°.

EXAMPLE 5

Preparation of 1-(2-cyclohexylamino-4-thiazolyl-methyl)-2-methyl-5-nitroimidazole 1.1 g. (0.005 mole) of 1-(3-chloroacetonyl)-2-methyl-5-nitroimidazole prepared as in Example 2, 0.8 g. (0.005 mole) of cyclohexyl thiourea and 5 ml. of alcohol were refluxed for 30 minutes in analogy to Example 4 above to give 1-(2-cyclohexylamino-4-thiazolylmethyl)-2-methyl-5-nitroimidazole of melting point 158–159°.

EXAMPLE 6

Preparation of 1-(2-dimethylamino-4-thiazolylmethyl)-2-methyl-5-nitroimidazole 8.7 g. (0.04 mole) of 1-(3-chloroacetonyl)-2-methyl-5-nitroimidazole prepared as in Example 2 was refluxed with N,N-dimethylthiourea in 25 ml. alcohol to give 1-(2-dimethylamino - 4 - thiazolylmethyl) - 2 - methyl - 5-nitroimidazole hydrochloride. When recrystallized from alcohol-ethyl acetate it melted at 181°. The free base crystallized from water in yellow needles melted at 117–118°.

EXAMPLE 7

Preparation of 1-(2-morpholinyl-4-thiazolylmethyl)-2-methyl-5-nitroimidazole 8.2 g. (0.0376 mole) of 1-(3-chloroacetonyl)-2-methyl-4-nitroimidazole, prepared as in Example 1, 5.5 g. (0.0376 mole) of thiocarbamylmorpholine and 25 ml. of alcohol were refluxed for 30 minutes. The solution gave upon dilution with water and neutralization with ammonia 1-(2 - morpholinyl - 4 - thiazolylmethyl) - 2 - methyl - 5 - nitroimidazole, melting point 168–169°.

EXAMPLE 8

Preparation of 1-(2-amino-4-thiazolylmethyl)-2-nitroimidazole 10 g. (0.049 mole) of 1-(3-chloroacetonyl)-2-nitroimidazole, 4 g. (0.053 mole) of thiourea and 50 ml. of alcohol were refluxed for 30 minutes. Upon chilling the hydrochloride of 1-(2-amino-4-thiazolylmethyl)-2-nitroimidazole crystallized out. The product melted at 180–182°. The free base was obtained in yellow crystals melting at 175–176° by neutralizing the aqueous solution of the hydrochloride with ammonia.

1-(3-chloroacetonyl)-2-nitroimidazole was obtained by stirring a solution of 1-(3-chloro-2-hydroxypropyl)-2-nitroimidazole in 10 times its amount by volume of 10 N sulfuric acid and adding sodium bichromate in portions at temperatures of 50–60°. After neutralization with ammonia the product was extracted with ethyl acetate. It melted at 92°. 1-(3-chloro-2-hydroxypropyl)-2-nitroimidazole was obtained from 2-nitroimidazole and epichlorohydrin according to the following procedure:

A mixture of 52.3 g. (462 mmoles) of powdered sublimed 2-nitroimidazole, 315 ml. of epichlorohydrin and 5.25 g. of anhydrous potassium carbonate was stirred and heated. When boiling commenced the heating mantle was shut off, but left in place and the reaction mixture was boiled briskly for 10 minutes. The hot mixture was filtered and the insoluble material was washed with boiling ethanol. From the refrigerated filtrate crude product was obtained. This was recrystallized from 1100 ml. of boiling ethanol to give 1-(2-nitro-1-imidazolyl)-3-chloro-2-propanol as yellow crystals, melting point 156–158°.

EXAMPLE 9

Preparation of 1-(2-amino-4-thiazolylmethyl)-2-isopropyl-5-nitroimidazole 11 g. (0.045 mole) of 1-(3-chloro-2-hydroxypropyl)-2-isopropyl-5-nitroimidazole was dissolved in 110 ml. of 10 N aqueous sulfuric acid and 50 ml. of acetic acid. 9 g.

of sodium bichromate was added in portions at 40–50° under stirring and the reaction mixture allowed to stand at room temperature overnight. The mixture was diluted with 100 ml. of water, neutralized with ammonia to a pH of 4–6 and the product extracted with ethyl aceate. The solvent was removed by evaporation in vacuo, and the residue containing 1 - (3 - chloroacetonyl) - 2 - isopropyl-5-nitroimidazole was dissolved in 50 ml. of alcohol. The solution was then refluxed with 3.5 g. of thiourea for 30 minutes. The alcohol was evaporated in vacuo, and the residue dissolved in 100 ml. of water. The solution was filtered and the product precipitated from the filtrate by the addition of a slight excess of ammonia. The product was obtained as yellow crystals melting at 148–149°.

1 - (3 - chloro - 2 - hydroxypropyl) - 2 - isopropyl-5-nitroimidazole was prepared from 2-isopropyl-4- (or 5-nitroimidazole in analogy to the preparation of the lower homologue as described in Example 2 above. It formed white crystals of M.P. 102–103°.

EXAMPLE 10

Preparation of 1-(2-succinylamido-4-thiazolylmethyl)-2-methyl-5-nitroimidazole 6.3 g. (0.023 mole) of 1-(2-amino-4-thiazolylmethyl)-2-methyl-5-nitroimidazole hydrochloride, 2.5 g. (0.025 mole) of succinic anhydride and 6 ml. of pyridine were heated on a steam bath to 95–110° for 1 hour. After addition of 20 ml. of water, the product was obtained as crystals melting at 212°.

EXAMPLE 11

Preparation of (2-guanidyl-4-thiazolylmethyl)-2-methyl-5-nitroimidazole 11 g. (0.05 mole) of 1-(3-chloroacetonyl)-2-methyl-5-nitroimidazole, 11.8 g. (0.1 mole) of amidino thiourea and 50 ml. of methanol were refluxed on a steam bath for 30 minutes. The solution was diluted with 150 ml. of water and the product precipitated by the addition of ammonia to a strong alkaline reaction. It formed yellow prisms of M.P. 262–63°.

A dihydrochloride monohydrate was obtained by dissolving 11.5 g. of the base in 30 ml. of 3 N aqueous hydrochloric acid, evaporating in vacuo and slurrying the residue with alcohol, M.P. 186–187° (dec.).

EXAMPLE 12

This example illustrates pharmaceutical formulations incorporating the novel compounds of this invention.

1-(2-amino-4-thiazolylmethyl)-2-methyl-5-nitroimidazole 0.5 percent cream:

|  | Mg. per gram |
| --- | --- |
| 1-(2-amino-4-thiazolylmethyl)-2-methyl - 5-nitroimidazole | [1] 5.05 |
| Stearyl alcohol | 100.0 |
| Cetyl alcohol | 15.0 |
| White petrolatum | 70.0 |
| Methylparahydroxybenzoate, U.S.P. | 2.0 |
| Propyl parahydroxybenzoate, U.S.P. | 0.5 |
| Isopropyl palmitate | 60.0 |
| Polyoxyl 40 stearate, U.S.P. | 40.0 |
| Propylene glycol | 120.0 |
| Disodium versenate | 0.1 |
| Distilled water | 593.11 |

[1] 1 percent excess.

PROCEDURE (1) The stearyl alcohol, cetyl alcohol, petrolatum, propyl parahydroxybenzoate, isopropyl palmitate and polyoxyl 40 stearate were melted at 75 °C. The mixture was cooled to and maintained at 70° C.

(2) Disodium versenate and methyl parahydroxybenzoate were dissolved in hot distilled water to which was added the propylene glycol. The solution was mixed at 75° C. and slowly added to the oil solution prepared previously, using slow agitation. The emulsion was gradually cooled with slow stirring.

(3) When the temperature of the ointment reached 55° C., a solution of 1-(2-amino-4-thiazolylmethyl)-2-methyl-5-nitroimidazole was added and mixed with the ointment.

(4) When the temperature of the ointment reached 50° C., cold water was circulated in the jacket of the kettle and the ointment was cooled to 30° C. with stirring. The ointment was then transferred to storage containers.

0.1 percent ointment:

|  | Gms. per 100 gms. |
| --- | --- |
| 1-(2-maino-4-thiazolylmethyl)-2-methyl - 5-nitroimidazole | [1] 0.101 |
| Distilled water | 4.899 |
| Carbowax 4000 | 35.000 |
| Polyethylene Glycol 400 | 60.000 |

[1] 1 percent excess.

PROCEDURE (1) Polyethylene Glycol 400 and Carbowax 4000 were heated until a clear uniform mixture resulted. To this molten mix an aqueous solution of 1-(2-amino-4-thiazolylmethyl)-2-methyl-5-nitroimidazole was added and mixed.

(2) When uniform, the mixture was gradually cooled to 30° C. with constant stirring.

(3) The finished ointment was transferred into stainless steel storage containers.

Powder formulation:

|  | Gms. |
| --- | --- |
| 1-(2-amino-4-thiazolylmethyl)-2-methyl-5 - nitroimidazole | 1 |
| Talcum, U.S.P. | 94 |
| Magnesium stearate | 5 |

PROCEDURE (1) The talcum, magnesium stearate and 1-(2-amino-4-thiazolylmethyl) - 2 - methyl - 5 - nitroimidazole were thoroughly mixed in a suitable size stainless steel dry powder mixer.

(2) The mixture was then passed through a Fitzpatrick Model D Comminuting Machine and again mixed in the powder mixer.

1 percent tincture:

|  | Gms. |
| --- | --- |
| 1-(2-amino-4-thiazolylmethyl)-2 - methyl - 5-nitroimidazole | 1 |
| Isopropyl alcohol, N.F.[1] | 70 |
| Disodium edetate, U.S.P.[2] | 0.01 |
| Distilled water, q.s., add 100 cc. | |

[1] Meeting N.F. XII specifications.
[2] Meeting U.S.P. XVII specifications.

PROCEDURE (1) 1-(2-amino-4-thiazolylmethyl)-2-methyl-5 - nitroimidazole and disodium edetate were added to the isopropyl alcohol in a suitable glass lined or stainless steel container.

(2) These were mixed well until thoroughly dissolved and the solution was brought up to final volume with distilled water.

1-(2-amino-4-thiazolylmethyl)-2-methyl-5-nitroimidazole hydrochloride 0.5 percent cream:

|  | Mg. per gram |
| --- | --- |
| 1-(2-amino-4-thiazolylmethyl)-2-methyl - 5-nitroimidazole hydrochloride | [1] 5.05 |
| Stearyl alcohol | 100.0 |
| Cetyl alcohol | 15.0 |
| White petrolatum | 70.0 |
| Methylparahydroxybenzoate, U.S.P. | 2.0 |
| Propyl parahydroxybenzoate, U.S.P. | 0.5 |
| Isopropyl palmitate | 60.0 |
| Polyoxyl 40 stearate, U.S.P. | 40.0 |
| Propylene glycol | 120.0 |
| Disodium versenate | 0.1 |
| Distilled water | 593.11 |

[1] 1 percent excess.

PROCEDURE (1) The stearyl alcohol, cetyl alcohol, petrolatum, propyl parahydroxybenzoate, isopropyl palmitate and ployoxyl 40 stearate were melted at 75° C. The mixture was cooled to and maintained at 70° C.

(2) Disodium versenate and methyl parahydroxybenzoate were dissolved in hot distilled water to which was added the propylene glycol. The solution was mixed at 75° C. and slowly added to the oil solution prepared previously, using slow agitation. The emulsion was gradually cooled with slow stirring.

(3) When the temperature of the ointment reached 55° C., a solution of 1-(2-amino-4-thiazolylmethyl)-2-methyl-5-nitroimidazole hydrochloride was added and mixed with the ointment.

(4) When the temperature of the ointment reached 50° C., cold water was circulated in the jacket of the kettle and the ointment was cooled to 30° C. with stirring. The ointment was then transferred to storage containers.

0.1 percent ointment:

| | Gms. per 100 gms. |
|---|---|
| 1-(2-amino-4-thiazolylmethyl)-2-methyl-5-nitroimidazole hydrochloride | [1] 0.101 |
| Distilled water | 4.899 |
| Carbowax 4000 | 35.000 |
| Polyethylene Glycol 400 | 60.000 |

[1] 1 percent excess.

PROCEDURE (1) Polyethylene Glycol 400 and Carbowax 4000 were heated until a clear uniform mixture resulted. To this molten mix an aqueous soltuion of 1-(2-amino-4-thiazolylmethyl)-2-methyl-5-nitroimidazole hydrochloride was added and mixed.

(2) When uniform, the mixture was gradually cooled to 30° C. with constant stirring.

(3) The finished ointment was transferred into stainless steel storage containers.

Powder formulation:

| | Gms. |
|---|---|
| 1-(2-amino-4-thiazolylmethyl)-2-methyl-5-nitroimidazole hydrochloride | 1 |
| Talcum, U.S.P. | 94 |
| Magnesium stearate | 5 |

PROCEDURE (1) The talcum, magnesium stearate and 1-(2-amino-4-thiazolylmethyl)-2-methyl-5-nitroimidazole hydrochloride were thoroughly mixed in a suitable size stainless steel dry powder mixer.

(2) The mixture was then passed through a Fitzpatrick Model D Comminuting Machine and again mixed in the powder mixer.

1 percent tincture:

| | Gms. |
|---|---|
| 1-(2-amino-4-thiazolylmethyl)-2-methyl-5-nitroimidazole hydrochloride | 1 |
| Isopropyl alcohol, N.F.[1] | 70 |
| Disodium edetate, U.S.P.[2] | 0.01 |
| Distilled water, q.s., add 100 cc. | |

[1] Meeting N.F. XII specifications.
[2] Meeting U.S.P. XVII specifications.

PROCEDURE (1) 1-(2-amino-4-thiazolylmethyl)-2-methyl-5-nitroimidazole hydrochloride and disodium edetate were added to the isopropyl alcohol in a suitable glass lined or stainless steel container.

(2) These were mixed well until thoroughly dissolved and the solution was brought up to final volume with distilled water.

I claim:

1. A compound of the formula

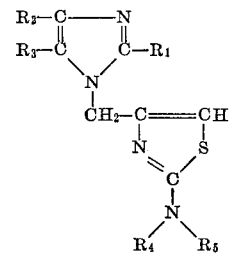

wherein $R_1$, $R_2$ and $R_3$ are each independently selected from the group consisting of hydrogen, halogen, lower alkyl and nitro, such that at least one of $R_1$, $R_2$ and $R_3$ is nitro; $R_4$ is hydrogen or lower alkyl and $R_5$ is selected from the group consisting of hydrogen, lower alkyl, cyclolower alkyl of five or six carbon atoms, lower alkenyl, lower alkynyl, and phenyl.

2. The compound according to claim 1 wherein $R_1$ is methyl, $R_2$ is nitro and $R_3$, $R_4$ and $R_5$ are each hydrogen, i.e., the compound 1-(2-amino-4-thiazolylmethyl)-2-methyl-4-nitroimidazole.

3. The compound according to claim 1 wherein $R_1$ is methyl, $R_2$ is hydrogen, $R_3$ is nitro and $R_4$ and $R_5$ are each hydrogen, i.e., the compound 1-(2-amino-4-thiazolylmethyl)-2-methyl-5-nitroimidazole.

4. The compound according to claim 1 wherein $R_1$ is methyl, $R_2$ is hydrogen, $R_3$ is nitro, $R_4$ is hydrogen and $R_5$ is phenyl, i.e., the compound 1-(2-anilino-4-thiazolylmethyl)-2-methyl-5-nitroimidazole.

5. The compound according to claim 1 wherein $R_1$ is methyl, $R_2$ is hydrogen, $R_3$ is nitro, $R_4$ is hydrogen and $R_5$ is cyclohexyl, i.e., the compound 1-(2-cyclohexylamino-4-thiazolylmethyl)-2-methyl-5-nitroimidazole.

6. The compound according to claim 1 wherein $R_1$ is methyl, $R_2$ is hydrogen, $R_3$ is nitro and $R_4$ and $R_5$ are each methyl, i.e., the compound 1-(2-dimethylamino-4-thiazolylmethyl)-2-methyl-5-nitroimidazole.

7. The compound according to claim 1 wherein $R_1$ is nitro, $R_2$, $R_3$, $R_4$ and $R_5$ are each hydrogen, i.e., the compound 1-(2-amino-4-thiazolylmethyl)-2-nitroimidazole.

8. The compound according to claim 1 wherein $R_1$ is isopropyl, $R_2$ is hydrogen, $R_3$ is nitro and $R_4$ and $R_5$ are each hydrogen, i.e., the compound 1-(2-amino-4-thiazolylmethyl)-2-isopropyl-5-nitroimidazole.

References Cited

UNITED STATES PATENTS

| 2,636,037 | 4/1953 | Spraque et al. | 260—306.8 X |
| 3,156,699 | 11/1964 | Karmas | 260—306.8 |

ALEX MAZEL, Primary Examiner

J. H. TURNIPSEED, Assistant Examiner

U.S. Cl. X.R.

260—243, 247.1, 268, 293.4, 307, 309.7, 310; 424—270, 246, 248, 250, 268